United States Patent [19]

Roos

[11] Patent Number: 4,619,377

[45] Date of Patent: Oct. 28, 1986

[54] TAP

[76] Inventor: Paul F. Roos, 'Taurus', May Street, Claremont, Cape Town, Cape Province, South Africa

[21] Appl. No.: 594,251

[22] Filed: Mar. 28, 1984

[30] Foreign Application Priority Data

Mar. 30, 1983 [ZA] South Africa ............... 83/2300
Oct. 28, 1983 [ZA] South Africa ............... 83/8070

[51] Int. Cl.[4] ............................................. B67B 7/24
[52] U.S. Cl. ........................................ 222/83; 222/512; 222/516; 222/549
[58] Field of Search ............... 222/80, 81, 83, 83.5, 222/88-91, 105, 107, 499, 502, 505, 507, 512, 513, 516, 519, 523, 548, 549, 553

[56] References Cited

U.S. PATENT DOCUMENTS

| 1,519,347 | 12/1924 | Anderson | 222/519 |
|---|---|---|---|
| 1,663,195 | 3/1928 | Ford | 222/519 |
| 3,173,579 | 4/1964 | Curie et al. | 222/105 |
| 3,216,630 | 11/1965 | Stull | 222/499 |
| 3,239,104 | 3/1966 | Scholle | 222/81 |
| 3,448,889 | 7/1969 | Malpas | 220/63 |
| 3,493,146 | 5/1967 | Conners et al. | 222/153 |
| 4,440,316 | 4/1984 | Christine | 222/83.5 |
| 4,469,249 | 9/1984 | Malpas et al. | 222/83 |
| 4,475,670 | 10/1984 | Rutter | 222/83 |

FOREIGN PATENT DOCUMENTS

| 1148487 | 5/1963 | Fed. Rep. of Germany . |
| 94590 | 8/1949 | New Zealand . |
| 747882 | 12/1974 | South Africa . |
| 792468 | 5/1979 | South Africa . |
| 1130259 | 10/1968 | United Kingdom . |
| 1168465 | 9/1969 | United Kingdom . |
| 1163489 | 10/1969 | United Kingdom . |
| 2082152 | 3/1982 | United Kingdom ............... 222/83 |

OTHER PUBLICATIONS

"Packaging Products (Liquids)" brochure, Jan.–Jun., 1983, Wrightcel Ltd.

Primary Examiner—Joseph J. Rolla
Assistant Examiner—Michael S. Huppert
Attorney, Agent, or Firm—Leydig, Voit & Mayer, Ltd.

[57] ABSTRACT

A tap primarily intended for 'bag-in-a-box' constructions including a plunger (80) which is in a barrel (52). A knob (68) is fast with the plunger (80) and is arranged so that it and the plunger perform a spiral movement when it is rotated. The tap includes a seat (66) with which a sealing portion (86) of the plunger (80) co-operates. The inlet to the barrel is through one end thereof and there is an outlet port (64) in the wall thereof. The part of the plunger (80) outwardly of the sealing portion (86) constitutes a wiping edge which moves across the port (64) during opening and closing movement of the plunger (80). A piercing element (94) is provided which, the first time the tap is opened and closed, is forced through the hermetically sealed pouch (P). The tap is leak-proof, does not permit air to enter the pouch P in normal operation and, because of the wiping action provided, does not drip.

6 Claims, 7 Drawing Figures

TAP

This invention relates to taps for controlling liquid flow.

BACKGROUND TO THE INVENTION

The so-called 'bag-in-box' concept is now being widely used to package wine, fruit juices and other liquids. The liquid is contained in a pouch of synthetic plastics material and the pouch is placed in a cardboard box.

A tap is provided for opening the pouch and enabling controlled amounts of liquid to be dispensed. The entire tap can be secured to the pouch. Alternatively, a gasket or flange can be secured to the pouch and the tap can be placed loose in the cardboard box. In this latter form, as the tap is pushed into the gasket or flange, the pouch is punctured.

The tap should be simple in construction and inexpensive to make. It should not leak or drip and must not permit ingress of air into the bag.

Many taps have been proposed and the object of the present invention is to provide a tap which meets the conditions set out above more successfully than known taps.

BRIEF DESCRIPTION OF THE INVENTION

According to the present invention there is provided a tap comprising a cylindrical barrel and a clyindrical plunger which is movable along the barrel internally thereof, the barrel having an internal seat, a port in the wall thereof which port serves as an outlet from the barrel, and an inlet thereto, said inlet and port being on opposite sides of said seat, and the plunger being displaceable along the barrel between a first position in which a sealing surface thereof is in engagement with said seat to close said inlet off from said port and a second position in which said sealing surface is spaced from said seat to permit flow from said inlet to said port, said plunger having an edge which, as the plunger is displaced from said second position thereof to said first position thereof, moves across said port from a position on one side of said port to a position on the other side of said port.

In a preferred form said seat includes a seat surface which is skew with respect to the common longitudinal axis of the plunger and barrel whereby when said sealing surface of the plunger is urged against the seat surface, the plunger is deformed and a sealing face thereof is urged into sealing engagement with a further seat surface of the barrel. The first mentioned seat surface and said sealing surface can, in this preferred form, be arranged so that deformation of the plunger increases its outside diameter whereby its outer periphery engages the cylindrical inner face of said barrel.

Said plunger can be attached to or integral with a knob, there being means for guiding said knob along a spiral path. The means for guiding said knob preferably comprises spiral groove means in the outer face of the barrel, the knob inluding one or more protrusions entered in the spiral groove means. To obtain a force which holds the tap closed, said knob can have a resilient transverse end wall and the travel of said plunger can be such that said sealing surface thereof is in engagement with said seat before said knob has reached the end of its travel in the closing direction, said plunger deforming said resilient transverse end wall upon the knob being rotated beyond the position it occupies when said sealing surface engages said seat.

To adapt the tap for use with completely sealed pouches, a piercing element can be provided which is displaced through a piercing movement when said plunger is first displaced to the position in which said sealing surface and said seat are in engagement after the first displacement thereof which causes said sealing surface to move away from said seat. Desirably, said plunger includes a member which initially holds part of the piercing element in an inoperative position, the first displacement of the plunger which causes said sealing surface to move away from said seat allowing said part to move into the path along which said member must travel upon the plunger first being displaced to the position in which said sealing surface is in engagement with said seat whereby said member engages said part and displaces said piercing member.

In a preferred constructional form said member is constituted by a rod and said part is in the form of a resilient finger which is normally held in its inoperative position by said member; and said piercing element is in the form of a sleeve with a plurality of resilient fingers extending radially inwardly from said sleeve, the inner ends of the fingers together defining a central opening through which said rod passes, said fingers moving together to reduce the size of said opening upon the rod being withdrawn from said opening as the sealing surface is first displaced in the direction away from said seat. In this form it is desirable for the barrel to include a sleeve, the piercing element sleeve being co-axial with the sleeve of the barrel and the barrel having an internal step which prevents the piercing element moving with said rod when said plunger is first displaced to the position which said sealing surface is separated from said seat.

BRIEF DESCRIPTION OF THE DRAWINGS

For a better understanding of the present invention, and to show how the same may be carried into effect, reference will now be made, by way of example, to the accompanying drawings in which.

DETAILED DESCRIPTION OF THE DRAWINGS

Figure 1:
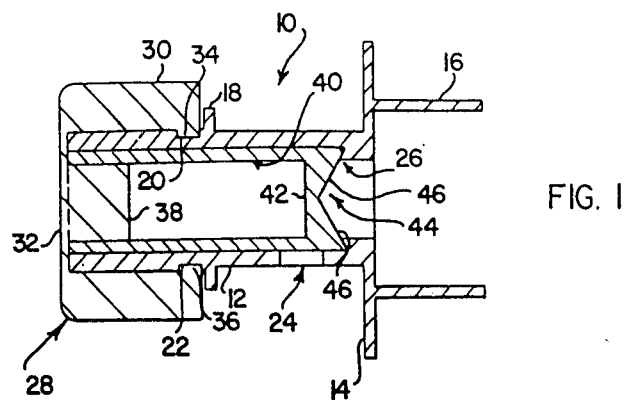
FIG. 1 is a section through a tap in accordance with the present invention, the tap being shown in its closed condition.
Figure 2:
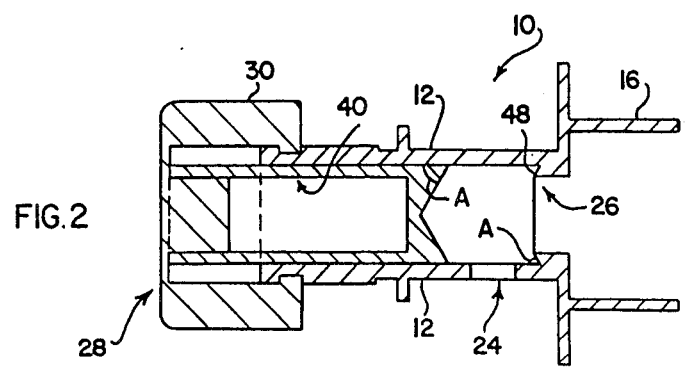
FIG. 2 is a further section through the tap of FIG. 1.

The tap 10 illustrated in FIGS. 1 and 2 of the drawings comprises a barrel 12 which is integral with a disc-like flange 14. A sleeve 16 of larger diameter than the barrel 12 protrudes from the flange 14 on the opposite side thereof to the barrel 12. A circular stop 18 protrudes from the barrel 12 approximately midway along its length.

Between the stop 18 and the left hand end of the barrel (as illustrated in FIGS. 1 and 2) there is, in the outer face of the barrel, a double start spiral groove designated 20 and 22. Only those portions of the grooves which lie in the plane of the section have been shown. Each groove extends through approximately 180° i.e. a half turn over its full extent. The spiral grooves 20, 22 terminate just short of the left hand end of the barrel 12 and are extended to the left hand end of the barrel by short axially extending parts.

An outlet port 24 is provided in the barrel wall between the stop 18 and the flange 14, and the barrel further includes an internal valve seat designated 26. The valve seat 26 will be described in more detail hereinafter.

A knob 28 including a skirt 30 and a transverse end wall 32 is fitted onto the barrel 12. The skirt 30 has two radially inwardly directed protrusions 34, 36 on the inner face thereof. The protrusions 34, 36 lie in the grooves 20, 22.

A boss 38 is provided on the inner face of the wall 32 of the knob 28, the boss 38 being a tight fit in one end of a hollow plunger 40. The plunger 40 is of generally cylindrical form and the end thereof remote from the boss 38 is closed by a transverse valve closure member 42. The member 42 has a conical recess 44 in the outer face thereof, this giving rise to a conical sealing surface 46. The surface 46 of the member 42 meets the side wall of the plunger 40 at an angle which has been designated A in FIG. 2.

The valve seat 26 includes a frusto-conical surface 48 (see FIG. 2), the angle between this surface and the inner surface of the barrel 12 also being designated A.

The tap described above is primarily intended for use with the so-called 'bag-in-a-box' system. In such a system the liquid to be packaged is contained within a pouch of sheet synthetic plastics material. One of the walls of the pouch has a circular hole punched in it and a sleeve-like gland is welded to the pouch in register with the hole. Neither the pouch nor the gland are shown in FIGS. 1 and 2. The sleeve 16 is, however, a push fit in the gland, the connection between the gland and the sleeve 16 being such that leakage between them is prevented. This arrangement is described in more detail hereinafter with reference to FIGS. 3 etc.

When the tap is closed, as shown in FIG. 1, the sleeve 16 and the part of the barrel 12 to the right of the seat 26 are liquid filled, being in communication with the interior of the pouch. When the knob 28 is rotated from the position illustrated in FIG. 1, axial movement thereof occurs in addition to the turning movement due to co-operation between the grooves 20, 22 and the protrusions 34, 36. Thus the knob 28 performs a spiral motion. As the boss 38 is a tight fit in the plunger 40, the plunger 40 is shifted to the left with the knob 28. The outer ring-like zone of the surface 46 of the member 42 thus separates from the surface 48 and further movement of the plunger 40 places the port 24 in communication with the interior of the pouch. The plunger 40 and knob 28 are now in the position shown in FIG. 2 and flow through the sleeve 16, the right hand part of the barrel 12 and the port 24 occurs.

When the knob 28 is turned in the other direction, the plunger 40 is moved in the opposite direction. As the front face of the member 42 moves past the port 24, the port 24 is closed and there is a wiping action which minimises the possibility of the tap dripping after it has been closed. Thereafter, the outer ring-like zone of the surface 46 re-engages the surface 48 to close-off the tap entirely.

As the surfaces 46, 48 are urged into contact during rotation of the knob 28 towards the closed position of the tap, the surface 48 tends to deflect the peripheral edge of the member 42 outwardly into engagement with the cylindrical inner face of the barrel 12. Thus there are two seals in series between the interior of the pouch and the port 24. The first seal exists where the surfaces 46, 48 are in engagement, and the second exists where the cylindrical outer face of the plunger 40 bears on the cylindrical inner face of the barrel 12.

The portions of the grooves 20, 22 which are closest to the stop 18 can be of lesser pitch than the remaining portions of the grooves or can extend circumferentially for a short distance. Thus there is little or no tendency for the knob 28 to rotate from the position it is left in when the tap is fully closed.

If desired the surfaces 46, 48 can be in engagement before the knob 28 has moved fully to the right. The knob 28 can be of resilient material and the end wall 32 of the knob accommodates the last part of the axial motion of the knob 28 by adopting a dome-shape. Bowing of the end wall 32 in this way results in a resilient force which urges the surfaces 46, 48 into engagement.

In a modified form, which has not been illustrated, the plunger 40 is formed with a series of slots extending circumferentially thereof. Each slot is circumferentially staggered with respect to the adjacent slots and the slots can extend, for example, through between 180°0 and 270° in circumferential extent. The effect of such slots is to enable the plunger 40 to function as a spring. In this form the surface 46 engages the surface 48 before the knob 28 has rotated to the position it occupies when the tap is fully closed. Thus the final part of the axial motion of the knob 28 compresses the plunger 40, such compression being accommodated by closing-up of the slots in the plunger. There is consequently a force derived from the resilient deformation of the plunger urging the surface 46 against the surface 48.

The two-start groove 20, 22 can be replaced by a single-start groove or by a groove having more than two starts.

It will be noted that there is at all times contact between the plunger 40 and the barrel 12. The fit of the plunger 40 in the barrel, and the length over which these components contact, is such that there is little prospect of leakage between the plunger and the barrel. There is thus a secondary seal which is operative even if the user fails fully to rotate the knob 28 to the closed position.

This secondary seal is also effective, when the tap is open, to minimise leakage of the flowing liquid along the tap between the barrel 12 and the plunger 40.

The tap 50 illustrated in FIGS. 3 to 6 comprises a barrel 52 integral with a disc-like flange 54. A sleeve 56 of larger diameter than the barrel 52 protrudes from the flange 54 on the opposite side thereof to the barrel 52. A circular stop 58 protrudes from the barrel 52 approximately midway along its length.

Figure 3:
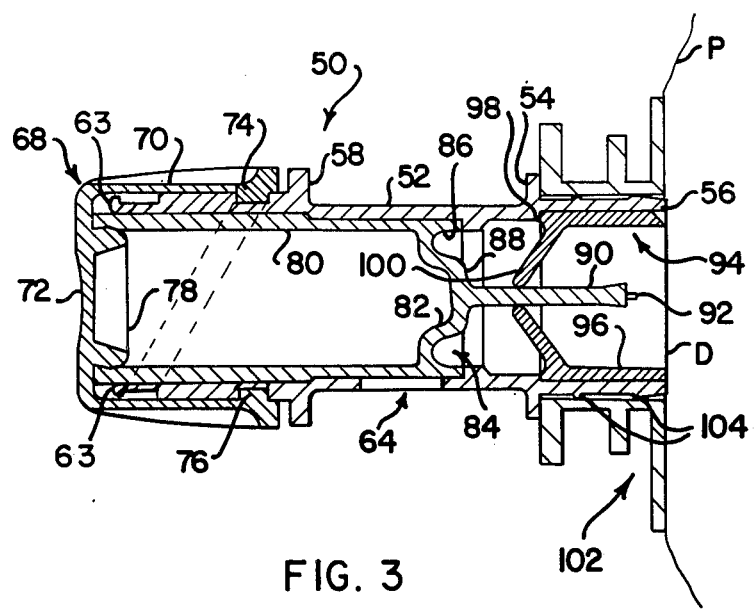
FIGS. 3 to 6 are sections through a further tap in accordance with the present invention, the tap being shown in different operative conditions and FIGS. 3 and 5 being sections in a plane at right angles to the section of FIGS. 4 and 6.
Figure 4:
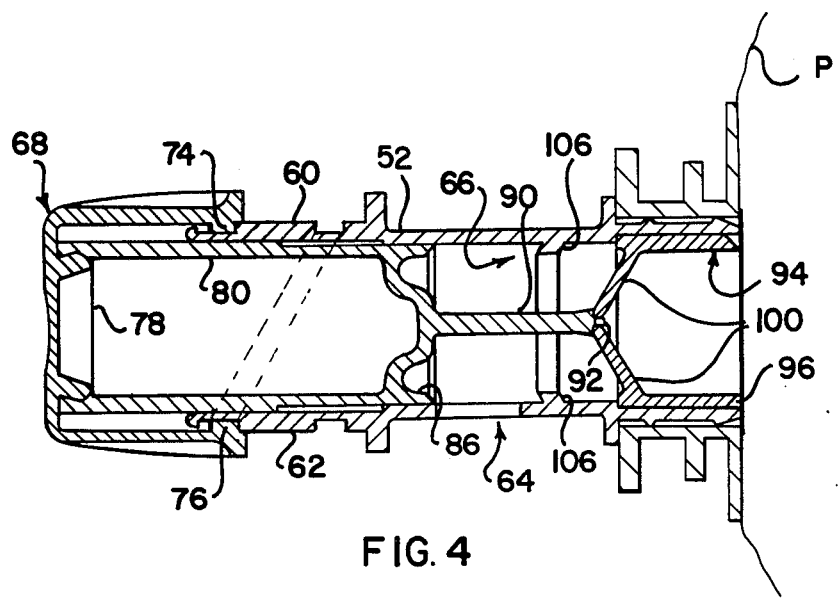
Figure 5:
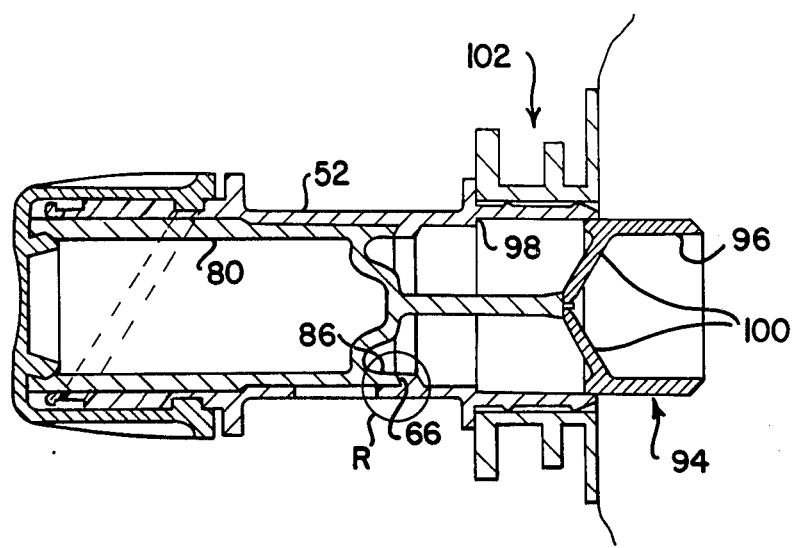
Figure 6:
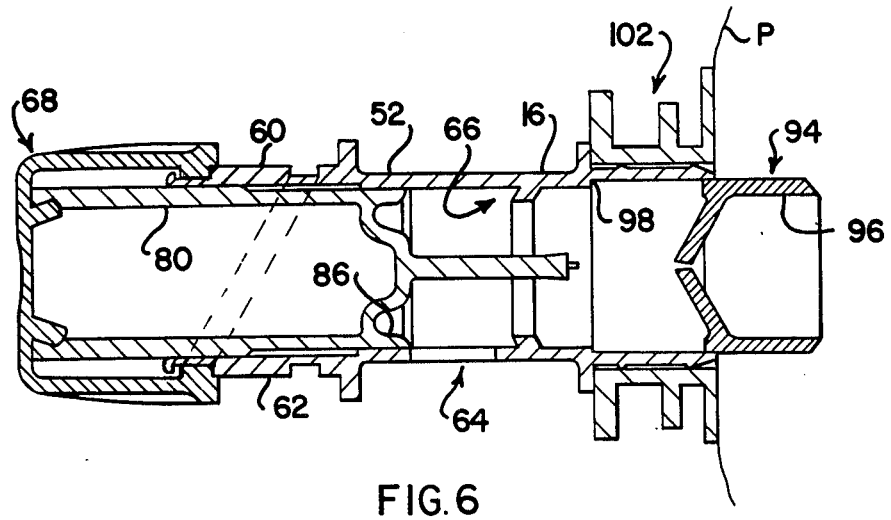

Between the stop 58 and the left hand end of the barrel (as illustrated in FIGS. 3 etc.) there is, in the outer face of the barrel, a double start spiral groove designated 60 and 62 (see particularly FIGS. 4 and 6). Each groove extends through approximately 90° i.e. a quarter turn over its full extent. The spiral grooves 60, 62 terminate just short of the left hand end of the barrel 52.

Between the ends of the grooves 60, 62 and the left hand end of the barrel 52 there are two relatively thin end walls 63 the height of each of which is less than the wall thickness of the barrel.

An outlet port 64 is provided in the barrel wall between the stop 58 and the flange 54. An internal valve seat is provided at 66 (see FIGS. 4 and 6 particularly), this being decribed in more detail hereinafter.

A knob 68 having a skirt 70 and a transverse end wall 72 is fitted onto the barrel 52. The skirt 70 has two radially inwardly directed protrusions 74, 76 on the radially inner face thereof. The protrusions 74, 76 lie in the grooves 60, 62. When the knob 68 is first fitted to the barrel 12, the two low walls 63 at the ends of the grooves 60, 62 are deformed to allow the protrusions 74, 76 to enter the grooves 70, 72. Thereafter the walls 63 act as stops which limit movement of the knob 68 as it is turned to open the tap.

A boss 78 is provided on the inner face of the wall 72 of the knob 78, the boss 78 being a tight fit in one end of a hollow plunger 80. The plunger 80 is of generally cylindrical form and the end thereof remote from the boss 78 is closed by a transverse valve closure member 82. The member 82 has an annular recess 84 in the outer face thereof, this recess lying inwardly of a cylindrical sealing portion 86.

The member 82 includes a central boss 88, there being a rod 90 integral with the boss 88. The rod 90 is flared at its free end to a maximum diameter and is extended beyond its maximum diameter portion by means of a pin 92. The rod 90 extends from within the barrel 52 past the seat 66 and into the sleeve 56.

A piercing element generally designated 94 lies within the sleeve 56. A clyindrical sleeve 96 forming part of the piercing element 94 abuts a step 98 (seen best in FIGS. 5 and 6) on the inner surface of the sleeve 56, this limiting movement of the element 94 to the left. The right hand end of the sleeve 94 is chamfered to provide a circular cutting edge.

A plurality of fingers 100 extend inwardly from the sleeve 96, the fingers 100 being resiliently flexible. The inner ends of the fingers 100 define an opening through which the rod 90 passes while the tap is in the condition shown in FIG. 3.

The sleeve 56 is pushed into the cylindrical part of a so-called flange or gland 102. It will be noted that the sleeve 56 has, on the outer face thererof, a plurality of raised circular ribs 104 which seal between the flange 102 and the sleeve 56.

Part of the pouch which contains the liquid being packaged is shown at P. One of the walls of the pouch has a circular hole punched in it and the flange 102 is welded to the pouch in register with the hole. A multi-layered disc D of synthetic plastics material is spot welded to the pouch P and lies across the circular hole punched in the wall of the pouch.

The filling procedure is as follows. After welding the flange 102 to the punched pouch, spot welding on the disc D and otherwise entirely sealing the pouch, a filling nozzle is inserted into the flange 102. It will be understood that, at this time, the tap 50 is not present. Liquid flows from the filling nozzle and into the pouch through the circular array of openings which exist between the disc D and the part of the pouch which is itself welded to the flange 102. Once the pouch has been filled, and before the filling nozzle is withdrawn, a sealing head is pressed against the other wall of the pouch, and said other wall urged towards the flange 102 until the sealing head grips the disc D and the other wall of the bag between itself and the flange 102. The nature of the material of that face of the disc D which faces the flange 102 is such that it welds to the portion of the pouch which is itself welded to the flange 102. The nature of the material of the other face of the disc is such that it does not weld to the material which constitutes the inner face of the pouch. Thus the circular array of openings mentioned above are closed, and the pouch is now hermetically sealed. The filling head is then withdrawn.

The tap, in the condition illustrated in FIG. 3, is pushed into the flange 102. The flange 54 prevents the tap being inserted too far, it being understood that over-insertion of the tap would result in the closure disc D being punctured.

To enable the contents of the pouch to be dispensed, the knob 68 is turned from the position illustrated in FIG. 3, axial movement thereof occurring in addition to the turning movement due to co-operation between the grooves 60, 62 and the protrusions 74, 76. Thus the knob 68 performs a spiral motion. As the boss 78 is a tight fit in the plunger 80, the plunger 80 is shifted to the left with the knob 68. The rod 90 slides through the opening defined by the fingers 100 and, when the rod 90 is clear of the fingers, the fingers snap to the position shown in FIG. 4 and bear on the pin 92. The tap is now in the condition shown in FIG. 4.

When the knob 68 is turned in the opposite direction, the rod 90 bears on the inner ends of the fingers 100. The piercing element 94 is thus urged to the right as viewed in FIG. 3 so that its circular cutting edge penetrates and cuts through the disc D. The contents of the pouch can now flow between the fingers 100 into the chamber which encircles the rod 90. However, in the condition shown in FIG. 5, there is no flow from the tap as the port 64 is closed by the plunger 80 and the sealing portion 86 is against the seat 66.

To dispense liquid from the tap, the knob 68 is turned again so that the plunger 80 is moved back to the position shown in FIG. 4. However, it will be understood that as the disc D has now been perforated, there is a flow path from the interior of the pouch to the port 64. The open condition of the tap is shown in FIG. 6.

When the knob 68 is turned in the other direction, the plunger 80 is moved in the opposite direction. As the leading edge of the portion 86 moves past the port 64, the port 64 is closed and there is a wiping action which minimizes the possibility of the tap dripping after it has been closed. The tap is fully closed when the portion 86 bears on the seat 66.

Figure 7:
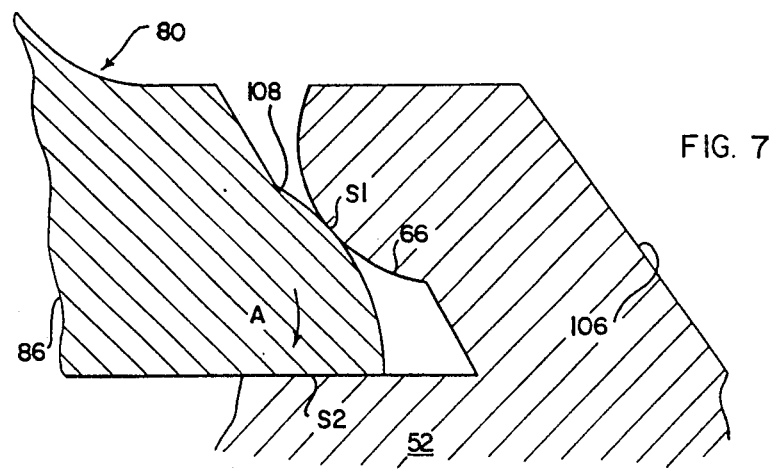
FIG. 7 is a detail of the sealing structure of the tap of FIGS. 3 to 6, the Figure showing to an enlarged scale the portion within the ring R of FIG. 5.

Turning now to FIG. 7, this illustrates a preferred form of the sealing portion 86 and seat 66. The seat 66 of the barrel 52 is on a radially inwardly directed flange 106 of the barrel 52 (see also FIG. 4). The co-operating seat surface 108 of the plunger 80 is the end surface of the portion 86. It will be noted that both the surface 108 and the seat 66 are of radiussed form and that the effective part of the seat surface of the seat 66 is skew with respect to the common longitudinal axis of the plunger barrel.

As the surface 108 is urged into contact with the seat 66 during rotation of the knob 68 towards the closed position of the tap, the seat 66 tends to deflect the peripheral edge of the portion 86 outwardly into enagement with the cylindrical inner face of the barrel 52 as shown by arrow A. Thus there are two seals in series between the interior of the pouch and the port 64. The first seal (S1) exists where the surface of the seat 66 and sealing surface 108 are in engagement, and the second (S2) exists where the cylindrical outer sealing face of the portion 86 bears on the seat surface constituted by the cylindrical inner face of the barrel 52.

The configuration of FIG. 7 can, of course, also be used in the embodiment of FIGS. 1 and 2.

I claim:

1. A tap comprising a cylindrical barrel and a cylindrical plunger which is movable along the barrel internally thereof, the barrel having an internal seat, a port in the wall thereof which port serves as an outlet from the barrel, and an inlet thereto, said inlet and port being on opposite sides of said seat, and the plunger being displaceable along the barrel between a first position in which a sealing surface thereof is in engagement with said seat to close said inlet off from said port, and a position in which said sealing surface is spaced from said seat to permit flow from said inlet to said port, said plunger having an edge which, as the plunger is displaced between said positions, moves across said port from a position on one side of said port to a position on the other side of said port, a piercing element in said barrel for piercing a liquid containing pouch to open the pouch, a member forming part of said plunger and which initially protrudes into said piercing element, said piercing element having a part which is initially held in an inoperative position by said member and which moves to an operative position in the path of return movement of said member upon the plunger first being displaced to cause said sealing surface to move away from the seat.

2. A tap as claimed in claim 1, wherein said member is in the form of a rod and said part is in the form of a resilient finger which is normally held in its inoperative position by said member.

3. A tap as claimed in claim 2, wherein said piercing element is in the form of a sleeve with a plurality of resilient fingers extending radially inwardly from said sleeve, the inner ends of the fingers together defining a central opening through which said rod passes, said fingers moving together to reduce the size of said opening upon the rod being withdrawn from said opening as the sealing surface is first displaced in the direction away from said seat.

4. A tap as claimed in claim 3 in which said barrel includes a sleeve, the piercing element sleeve being co-axial with the sleeve of the barrel and the barrel having an internal step which prevents the piercing element moving with said rod when said plunger is first displaced to the position which said sealing surface is separated from said heat.

5. A tap comprising a cylindrical barrel and a deformable cylindrical plunger which is movable along the barrel internally thereof, the barrel having an internal seat structure, a port in the wall thereof which port serves as an outlet from the barrel, and an inlet thereto, said inlet and said port being on opposite sides of said seat structure, and the plunger being displaceable along the barrel between first and second positions, said plunger being in said first position when sealing faces thereof are in engagement with said seat structure thereby limiting further movement of the plunger along the barrel and closing-off said port from said inlet, said sealing faces being spaced from said seat structure when the plunger is in its second position thereby to permit flow from said inlet to said port, said plunger having an edge which, as the plunger is displaced between said positions, moves across said port from a position on one side of said port to a position on the other side of said port, said seat structure comprising a first cylindrical surface which is part of the inner face of the barrel and a second circumferentially extending surface which is closer to the common longitudinal axis of the barrel and plunger than is said first surface and which is skew with respect to said first surface, said plunger including a first circumferentially extending face which co-operates with said first cylindrical surface and a second circumferentially extending face which is skew with respect to the first face and which co-operates with said second surface, engagement between said skew face and said skew surface upon closing of the tap deforming the plunger and increasing its outside diameter so that said first face is urged into engagement with said first surface.

6. A tap as claimed in claim 5 and including a knob attached to or integral with said plunger, there being means for guiding said knob along a spiral path, and said knob having a resilient transverse end wall, the travel of said plunger being such that said sealing surface thereof is in engagement with said seat before said knob has reached the end of its travel in the closing direction, said plunger deforming said resilient transverse end wall upon the knob being rotated beyond the position it occupies when said sealing surface engages said seat.

* * * * *